United States Patent [19]

Morio

[11] 3,839,649

[45] Oct. 1, 1974

[54] SIGNAL DISCRIMINATING CIRCUIT

[75] Inventor: Minoru Morio, Tokyo, Japan

[73] Assignee: Sony Corporation, Tokyo, Japan

[22] Filed: Mar. 2, 1973

[21] Appl. No.: 337,655

[30] Foreign Application Priority Data

Mar. 4, 1972 Japan .............................. 47-22600

Mar. 4, 1972 Japan .............................. 47-22601

[52] U.S. Cl. ............. 307/233 A, 328/133, 138/155, 178/5.4 R

[51] Int. Cl. .............................................. H03k 5/20

[58] Field of Search ............ 307/233; 328/138, 140, 328/134, 133, 155; 178/5.4 P, 5.4 C

[56] References Cited

UNITED STATES PATENTS

| | | | |
|---|---|---|---|
| 3,440,540 | 4/1969 | Hane et al. | 325/320 |
| 3,515,997 | 6/1970 | Babany | 328/134 |
| 3,522,544 | 8/1970 | Saldutti et al. | 307/233 |
| 3,721,753 | 3/1973 | Mima | 178/5.4 P |

OTHER PUBLICATIONS

"Demodulation Circuit for PAL Colour Television Receivers", W. Bruch, Electronic Engineering Parts I–II, Aug. 1964 & Sept. 1964.

*Primary Examiner*—Robert L. Richardson
*Assistant Examiner*—Mitchell Saffian
*Attorney, Agent, or Firm*—Lewis H. Eslinger, Esq.; Alvin Sinderbrand, Esq.

[57] ABSTRACT

Input signals of different frequencies are discriminated by the circuit of the invention which comprises an oscillator supplied with one of the input signals as an external synchronizing signal and operative to be locked by a specific one of the input signals having a frequency in a predetermined frequency range and a comparator which is also supplied with the input signal and with the output of the oscillator for producing an output signal when the input signal and the oscillator output are not the same in frequency. In one preferred embodiment the signal discriminating circuit is utilized to detect between PAL and NTSC color television signals in a color television receiver.

10 Claims, 14 Drawing Figures

SIGNAL DISCRIMINATING CIRCUIT

BACKGROUND OF THE INVENTION

The invention relates generally to signal discriminating circuits, and more particularly to such circuits which are operative to produce different outputs in response to the respective frequencies of the input signals applied thereto.

In some mechanisms or circuits, for example in a color television receiver, it is desirable to partially change the mechanism or circuit in accordance with the type of supplied information or input signal in order to achieve a predetermined operation. For example it would be desirable in a color television receiver to have such an apparatus for enabling the receiver to operate from both the European PAL color television signals and the NTSC color television signals.

In such circuits, if the respective input signals are different in frequency or contain pilot signals which are different in frequency it is possible to discriminate between the signals of different frequency by passband filters. However, if the input signals to be discriminated are very low in frequency, for example 50 Hz or 60 Hz, it is difficult to discriminate by means of passband filters. Even in the situation where such signals are of high frequency, it is also difficult to discriminate between them if they are close to one another in frequency.

SUMMARY OF THE INVENTION

The above and other disadvantages are overcome by the present invention of a circuit for discriminating between a plurality of input signals supplied thereto by utilizing differences between their frequencies, which comprises an oscillator supplied with one of a plurality of input signals as an external synchronizing signal and operative to be locked by the input signal if it has a frequency in a predetermined frequency range and comparing means which are also supplied with the input signal and with the output of the oscillator for producing an output signal provided the input signal to the comparing means and the oscillator output are not the same in frequency.

In one preferred embodiment a color television receiver is adapted by the signal discriminating circuit of the present invention to discriminate between PAL and NTSC color television signals and is further automatically adjusted by the circuit of the invention to operate with either of the PAL or NTSC signals.

It is therefore an object of the present invention to provide a circuit for discriminating between a plurality of input signals having different frequencies.

It is another object of the invention to provide a signal discriminating circuit capable of discriminating between a plurality of signals having different frequencies which are relatively low.

It is still another object of the invention to provide a signal discriminating circuit capable of discriminating between a plurality of input signals which are relatively close to each other in frequency.

A still further object of the invention is to provide a color television receiver capable of receiving and displaying color television signals transmitted in accordance with different color television systems by means of a circuit for discriminating between the frequencies of the color television signals of the different systems.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
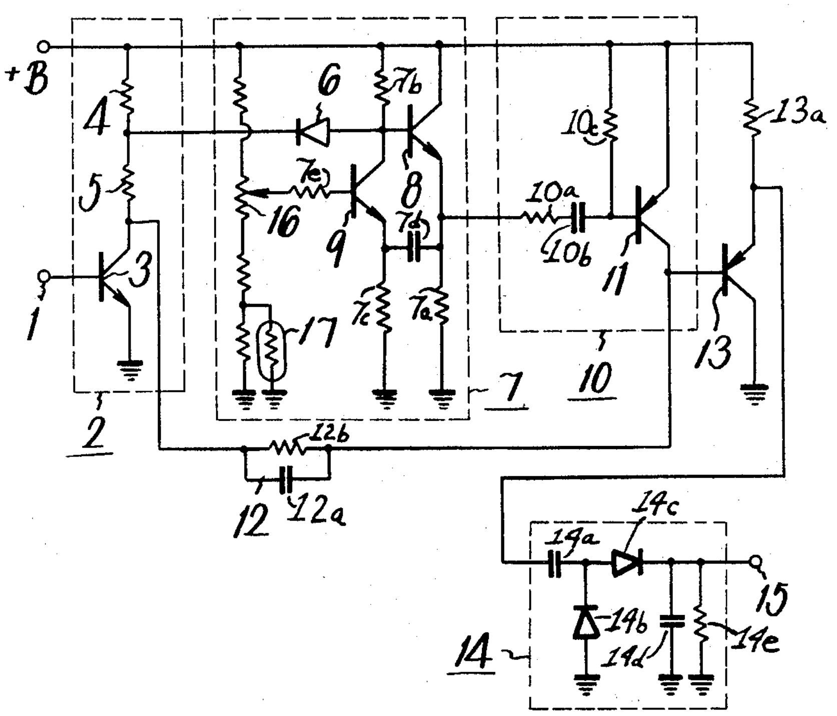
FIG. 1 is a schematic circuit diagram showing one embodiment of a signal discriminating circuit according to the present invention.

Referring now more particularly to FIG. 1 one of a plurality of input signals of different frequencies are supplied to an input terminal 1 which is connected to the base electrode of an NPN transistor 3. The emitter electrode of the transistor 3 is connected to the circuit ground and the collector electrode is connected in series through a resistor 5 and a resistor 4 to a B+ power supply. Together the transistors 3 and the resistors 4 and 5 constitute a waveform shaping circuit designated generally as 2. The interconnection of the resistors 4 and 5 is connected to the cathode of a diode 6 whose anode is connected to the base electrode of an NPN transistor 8. The collector electrode of the transistor 8 is connected to the B+ source and its emitter electrode is connected to the circuit ground through a resistor 7*a*. The base electrode of the transistor 8 is also connected to the B+ source through a resistor 7*b* and is connected directly to the collector electrode of an NPN transistor 9.

Figures 2A, 2B, 2C, 3A, 3B, 3C:
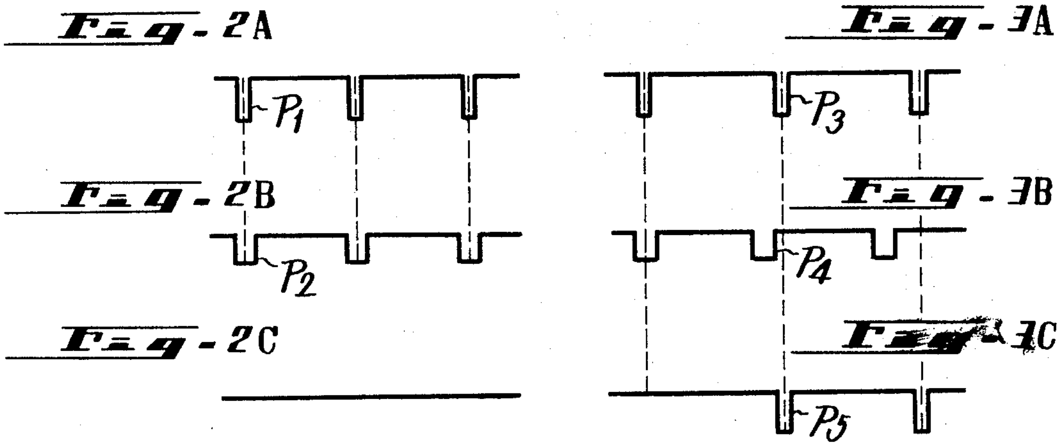
FIGS. 2A, 2B, 2C, 3A, 3B and 3C show schematic waveform diagrams used for explanation of the circuit shown in FIG. 1.

The emitter electrode of the transistor 9 is connected through a resistor 7*c* to the circuit ground and through a capacitor 7*d* to the emitter electrode of the transistor 8. The base electrode of the transistor 9 is connected through a resistor 7*e* to the sliding contact of a variable resistance 16 connected between the B+ source and the circuit ground. A portion of the resistance 16 is connected in parallel with a thermister 17 to the circuit ground to compensate for temperature variation. Together the components 6, 7*a*–7*e*, 8, 9, 16 and 17 constitute an oscillator circuit 7 which is designed to self-oscillate within a predetermined frequency range and to become phase-locked by an input signal supplied through the diode 6 provided the signal has a frequency within that range. The self-oscillation frequency of the oscillator 7 is varied by adjusting the sliding contact 16. The oscillator 7 is an emitter-coupled multivibrator, and in operation, the transistors 8 and 9 conduct alternately. When the transistor 8 becomes conductive, its emitter voltage rises to the upper level of the waveform $P_2$ in FIG. 2B and, initially, the emitter of the transistor 9 is also forced to rise to a level such that the transistor 9 is no longer conductive. The upper level of the waveform $P_2$ is generated while the capacitor 7*d* is charging through the resistor 7*c*. Finally, the voltage at the emitter of the transistor 9 reaches a level such that the transistor 9 can become conductive, thereby causing the voltage at the collector of the transistor 9 to drop. This voltage also is the base voltage for the transistor 8, which thereupon becomes non-conductive, halting current flow through the resistor 7*a* and causing the voltage thereacross to drop, as indicated by the negative-going pulse $P_2$. The capacitor 7*d* then discharges during the negative-going pulse $P_2$ until the voltage at the emitter of the transistor 8 is such that that transistor can again become conductive and start a new cycle.

For example, if the range of the oscillator 7 is between 51 Hz and 60 Hz then the sliding contact of the resistance 16 may be adjusted such that the oscillator 7 self-oscillates at 55Hz. In such a case an input signal of 60 Hz will cause the oscillator to become phase-locked on the input signal and to produce an output pulse with a frequency of 60 Hz. However, if an input signal of 50 Hz is supplied to the input terminal 1 then the oscillator 7 will self-oscillate at 55 Hz and not be in phase with the input signal.

The output from the oscillator 7 is taken at the emitter electrode of the transistor 8 and is supplied through a series connection of a resistance 10*a* and a capacitor 10*b* to the base electrode of a PNP transistor 11. The base electrode of the transistor 11 is also connected through a resistor 10*c* to the B+ source and its emitter electrode is connected directly to the B+ source. The elements 10*a*–11, inclusive, constitute a comparator circuit 10.

The collector electrode of the transistor 11 is connected through a parallel circuit 12 comprising a resistor 12*b* and a capacitor 12*a* to the collector electrode of the transistor 3. The collector electrode of the transistor 11 is also connected directly to the base electrode of a PNP transistor 13 whose emitter electrode is connected through a resistor 13*a* to the B+ source and whose collector electrode is connected to the circuit ground.

The emitter electrode of the transistor 13 is connected to the input of a detector circuit 14 which includes a capacitor 14*a* connected to the cathode of a diode 14*b* whose anode is connected to the circuit ground. The cathode of the diode 14*b* is also connected to the anode of a diode 14*c* whose cathode is connected to an output terminal 15 and through a capacitor 14*d* connected in parallel with a resistor 14*e* to the circuit ground.

In operation, when an input signal having a frequency of 60 Hz is supplied to the input terminal 1 a negative going pulse signal P1 (FIG. 2A) having a frequency of 60 Hz is supplied through the parallel circuit 12 to the base electrode of a transistor 13. The oscillator 7, as described above, becomes phase-locked on the input signal supplied through the transistor 3 and the diode 6 and produces an output signal P2 which is in-phase with, and having the same frequency as the input signal to the base electrode of the transistor 13 as indicated by the waveform in FIG. 2B. The negative going oscillator output pulses P2 are supplied to the base of the transistor 11 and cause it to become conductive, thereby supplying positive pulses to the base of the transistor 13 at times coincident with the pulses P1 to prevent the transistor 13 from becoming conductive by the negative going pulse P1 from the parallel circuit 12. Thus if a signal of 60 Hz is supplied to the input terminal 1 the transistor 13 remains nonconductive and therefore the detector circuit 14 delivers no output voltage to the output terminal 15 to hold the output terminal 15 at the circuit ground potential.

On the other hand, if the input signal supplied to the terminal 1 is 50 Hz then a pulse P3 having a repetition frequency of 50 Hz (FIG. 3A) is supplied through the parallel circuit 12 to the base electrode of the transistor 13. Since the oscillator 7 is unable to phase-lock with the input signal it supplies a negative going signal P4 (FIG. 3B) to the base electrode of the transistor 11 having a repetition frequency of 55Hz. Since the waveforms P3 and P4 are not of the same frequency and phase the pulse P3 is supplied to the base of the transistor 13 when the transistor 11 is in its non-conductive state. Thus this pulse P3 causes the transistor 13 to become conductive to produce a series of negative going pulses P5 (FIG. 3C) having a repetition frequency of 50 Hz. The detector, which is supplied with the pulse P5, delivers a positive DC voltage to the output terminal 15 by means of the voltage doubling circuit comprised of the elements 14*a*–14*e*, inclusive, as will be readily understood by those skilled in the art.

Thus the circuit of the invention positively discriminates between input signals of different frequencies, for example, 50 Hz and 60 Hz, by producing or not producing, respectively, an output signal. Although in the above description only two input signals having different frequencies are discriminated in other embodiments a specific one of a plurality of, for example three, input signals may be discriminated.

Figure 7:
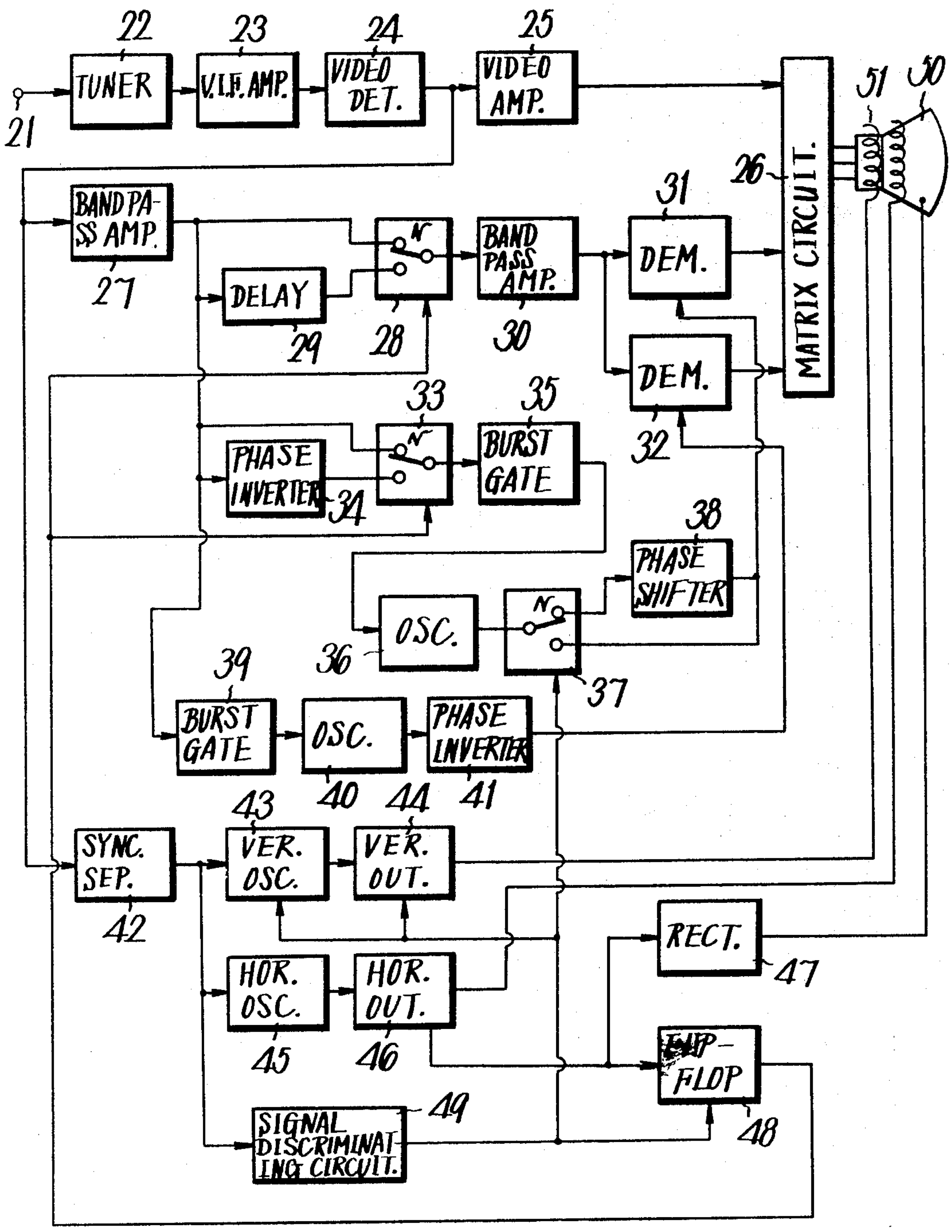
FIG. 7 is a schematic block diagram showing one example of a color television receiver employing a signal discriminating circuit according to the present invention.

Referring now more particularly to FIG. 7 a color television receiver utilizing a circuit of the invention will now be described in which the receiving condition of the receiver is automatically changed in accordance with an input color television signal of the PAL or the NTSC system. At present, the NTSC color television system is employed in Japan and the American continents whereas the PAL system is employed in several of the European countries. When the color television signals in both systems are compared, the field frequency of the NTSC system is 60 Hz whereas in the PAL system it is 50 Hz. The number of horizontal scanning lines in the NTSC system is 525 whereas it is 625 in the PAL system. The frequency of the color subcarrier in the NTSC system is 3.58 MHz and 4.43 MHz in the PAL system.

Figure 4:
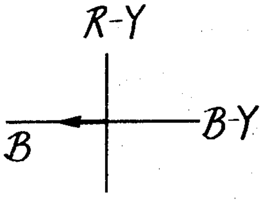
FIGS. 4, 5 and 6 show vector diagrams used for explanation of color television signals.
Figure 5:
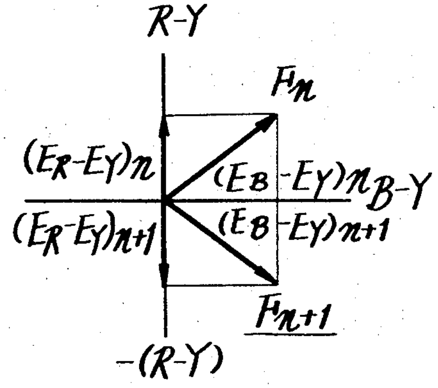
Figure 6:
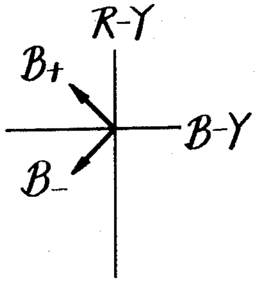

Furthermore, in the NTSC system the phase of the modulation axes for modulation of the color subcarrier with color difference signals R-Y and B-Y are fixed as illustrated in FIG. 4 in which a first signal B always coincides with the −(B-Y) axis in phase. On the other hand, in the PAL system the phase of the modulation axis for modulation of the color subcarrier by a red color difference signal R-Y, is phase-inverted at every second line interval as shown in FIG. 5. During a line interval in the PAL system in which the phase of the modulation axis for the red color difference signal coincides with the (R-Y) axis, a burst signal B+ with the phase advanced by 135° from the B-Y axis is transmitted, while during a line interval in which the phase of the modulation axis for the red color difference signal coincides with the −(R-Y) axis, a burst signal B− with the phase retarded by 135° from the B-Y axis is transmitted as shown in FIG. 6. With reference to FIG. 5, F$n$ and F$n+1$ show modulated signals in two successive lines and $(E_R-E_Y)n$, $(E_B-E_Y)n$, $(E_R-E_Y)n+1$ and $(E_B-E_Y)n+1$, respectively, show their components on each axis. Further, the line frequency is 15.75 KHz in the NTSC system and 15.63 KHz in the PAL system.

In order to selectively reproduce either of such two color television signals, it is necessary to switch a part of the circuit of the color television receiver in accordance with the respective television signals. To achieve this switching automatically, it is necessary to determine to which system the applied television signal belongs.

To carry out such discrimination, it might be suggested to utilize the fact that both the field frequencies and line frequencies of the television signals in the two systems are different, respectively, from each other. However, since the field frequencies are 60 Hz in the NTSC system and 50 Hz in the PAL system, which are very low, and the line frequencies are 15.75 KHz in the former and 15.63 KHz in the latter, which are relatively high but close to each other, it is very difficult to discriminate between the signals by applying the vertical synchronizing signal or the horizontal synchronizing signal to, for example, a filter with different passbands and to detect which filter produces an output.

With the color television receiver according to this invention, however, the signal discriminating circuit constructed as above is used to discriminate the signals applied thereto by utilizing the difference between the field frequencies in both the systems.

An embodiment of a color television receiver according to this invention will now described with reference to FIG. 7. The embodiment shown in FIG. 7 reproduces the color television signals of both the NTSC system and the PAL system generated by means of, for example, a video tape recorder having color subcarriers which are both converted to 4.43 MHz.

A color television signal is fed to an input terminal 21 and is sequentially applied to a tuner 22, a video intermediate frequency amplifier 23 and a video detector 24. The detected output from the video detector 24 is fed to a video amplifier 25 which applies it as a luminance signal to a matrix circuit 26. The output from the video detector 24 is further fed to a band pass amplifier 27 from which a chrominance signal is derived.

The chrominance signal from the band pass amplifier 27 is fed directly to one input terminal of a switching circuit 28 but is fed to the other switching circuit input terminal through a delay circuit 29 which delays the signal applied thereto by one line interval of the PAL system color television signal. The output from the switching circuit 28 is fed through a band pass amplifier 30 to demodulators 31 and 32, respectively. The chrominance signal from the band pass amplifier 27 is also fed directly to one input terminal of a second switching circuit 33 and through a (180°) phase inverter 34 to its other input terminal. The output from the switching circuit 33 is fed to a burst gate circuit 35 which extracts a burst signal and applies the burst signal to an oscillator 36 to drive it. The output from the oscillator 36 is applied to the switching terminal of a third switching circuit 37. The output obtained at one output terminal (N) of the switching circuit 37 is fed to the demodulator 31 through a phase shifter 38 which shifts the signal applied thereto by 90°, for example, while the output obtained at the other switch output terminal is fed directly to the same demodulator 31. The chrominance signal from the band pass amplifier 27 is further fed to a burst gate circuit 39 which delivers a burst signal to an oscillator 40 to drive it. The output from the oscillator 40 is applied through a (180°) phase inverter 41 to the demodulator 32.

The detected video output from the video detector 24 is also fed to a synchronizing signal separator 42 which extracts a vertical synchronizing signal to drive a vertical oscillator 43. The oscillation output from the vertical oscillator 43 is fed to a vertical output circuit 44 which produces a vertical scanning signal. The vertical scanning signal is applied to a deflection device 51 of a cathode ray tube 50. The horizontal synchronizing signal from the synchronizing signal separator 42 is fed to a horizontal oscillator 45 to drive the same. The oscillation output from the horizontal oscillator 45 is fed to a horizontal output circuit 46, the horizontal scanning signal from which is applied to the deflection device 51 of the cathode ray tube 50. The horizontal pulse derived from the horizontal output circuit 46 is applied to a high voltage rectifier 47, the high voltage output from which is fed to the anode of the cathode ray tube 50. The horizontal pulse also drives a flip-flop circuit 48. The output from the flip-flop circuit 48 is applied to the switching circuits 28 and 33, respectively, as a switching signal. The predetermined demodulated color signals produced by the demodulators 31 and 32, respectively, are fed to the matrix circuit 26 together with the luminance signal and the outputs from the matrix circuit 26 are then fed to the cathode ray tube 50 to control the electron beams in a manner well known in the art.

The vertical synchronizing signal from the synchronizing signal separator 42 is also applied to a signal discriminating circuit 49 of the type described above in connection with FIG. 1 to discriminate which of the NTSC and PAL system color television signals the signal belongs to. The discriminated output from the signal discriminating circuit 49 is fed to the flip-flop circuit 48 to control the same in a manner mentioned later, and also to the switching circuit 37, the vertical oscillator 43 and the vertical output circuit 44 respectively to control them.

In the case where a color television signal of the NTSC system, in which the frequency of its color subcarrier is made to be 4.43 MHz, is applied to the input terminal 21 of the color television receiver, by way of example, the input terminal of the signal discriminating circuit 49 is supplied with the vertical synchronizing signal of 60 Hz, so that no output voltage is obtained at the output terminal of the discriminating circuit 49 in the manner as mentioned above. As a result, it is determined that a color television signal of the NTSC system is applied to the input terminal 21 of the receiver.

In the case where the output voltage obtained at the output terminal of the signal discriminating circuit 49 is zero as mentioned above, the flip-flop circuit 48 is held in a constant operating state, without being reversed by the horizontal pulse, by making one of transistors of which the flip-flop circuit is constructed forcibly non-conductive by the proper application of bias voltages to the flip-flop. Thus, the switching circuits 28, 33 and 37 remain in the switched condition N shown in FIG. 7.

Therefore when an NTSC color television signal is fed to the input terminal 21, the chrominance signal from the band pass amplifier 27 is fed directly to the demodulators 31 and 32 through the switching circuit 28 and the band pass amplifier 30. The burst signal B, which is converted in frequency to 4.43 MHz and coincides in phase with the −(B-Y) axis, is obtained from the burst gate circuit 35 and a reference signal with the same phase as that of the burst signal B is obtained from the oscillator 36. Since the reference signal is fed to the phase shifter 38 through the switching circuit 37 in the position shown in FIG. 7, a reference signal with a phase coincident with the R-Y axis is derived from the (90°) phase shifter 38 and is fed to the demodulator 31. Another burst signal B, similar to the burst signal from the burst gate 35, is derived from the burst gate circuit 39 and a reference signal which is the same in phase is obtained from the oscillator 40. Hence a second reference signal coincident in phase with the B-Y axis is obtained from the (180°) phase inverter 41 and is fed to the demodulator 32. The demodulators 31 and 32 are thus able to produce the predetermined demodulated NTSC color signals.

Means are provided in the vertical oscillator 43 and the vertical output circuit 44 which are responsive to the output of the signal discriminating circuit 49 to change the time constant of the oscillator 43 and the amplification of the vertical output circuit 44 so that in the case where the output voltage appearing at the output terminal of the signal discriminating circuit 49 is zero as described above, the frequency of the output signal from the vertical oscillator 43 is made to be 60 Hz and the amplitude of the vertical scanning signal from the vertical output circuit 44, and hence the size of the picture and the linearity of the vertical scanning signal, are controlled to be in correspondence with those of the NTSC system color television signal.

Therefore, the NTSC system color television signal fed to the input terminal 21 is automatically reproduced on the screen of the receiver as a picture.

When a PAL system color television signal is fed to the input terminal 21 of the receiver, a vertical synchronizing signal of 50 Hz is applied to the input terminal of the signal discriminating circuit 49 and therefore a positive DC voltage is obtained at the output terminal of the discriminating circuit 49 in the manner described above in reference to the embodiment of FIG. 1. As a result, it is determined that the PAL system color television signal is being applied to the input terminal 21 of the receiver.

When the positive DC voltage obtained at the output terminal of the signal discriminating circuit 49 is applied as a counter-bias to the flip-flop circuit 48, the flip-flop is reversed at every line interval by the horizontal pulse from the horizontal output circuit 46. Thus, the switching circuits 28 and 33 are respectively switched at every line interval and the switching circuit 37 is switched to the opposite of the illustrated position in FIG. 7.

Figure 8:
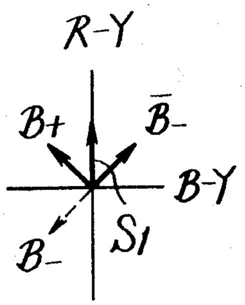

Accordingly, the switching circuits 28 and 33 are switched to the positions shown in FIG. 7 when the chrominance signal obtained from the band pass amplifier 27 has the phase of the modulation axis for the red color difference signal as the R-Y axis (referred to hereinafter as a plus signal). On the other hand, they are switched to the positions opposite to those shown in FIG. 7 when the chrominance signal has the phase of the modulation axis for the red color difference signal as the −(R-Y) axis (referred hereinafter as a minus signal). Thus from the switching circuit 28 there are derived signals in which the minus signal is replaced with the plus signal delayed by one line interval, that is, only the plus signals are sequentially obtained from the switching circuit 28 and then fed to the demodulators 31 and 32. As is shown in FIG. 8 the burst signal B+ contained in the plus signal and a signal $\overline{B-}$, which is provided by inverting the phase of the burst signal B− contained in the minus signal with the phase inverter 34, are alternately obtained through the output terminal of the switching circuit 33 and the burst gate circuit 35. A reference signal $S_1$ which has the same phase as the R-Y axis and is thus located just between the burst signals B+ and B−, as shown in FIG. 8, is derived from the oscillator 36. The reference signal $S_1$ is then fed directly to the demodulator 31 through the switching circuit 37 which is switched to the position opposite to that shown in the figure.

Figure 9:
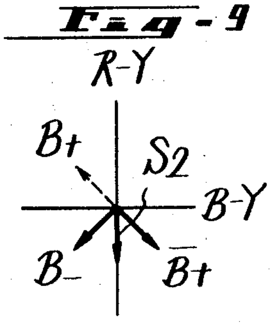

On the other hand, if the switching circuits 28 and 33 are switched to positions opposite to those in the figure when the plus signal is delivered from the band pass amplifier 27, and if these switching circuits 28 and 33 are switched to the illustrated positions when the minus signal is derived from the band pass amplifier 27, in a similar manner to that described above, only the minus signals are sequentially fed to the demodulators 31 and 32 from the switching circuit 28. Also a signal $\overline{B+}$, which is made by phase-inverting the burst signal B+ with the phase inverter 34 and the burst signal B− are alternately derived from the burst gate circuit 35 and hence a reference signal $S_2$ with a phase the same as the −(R-Y) axis and positioned just between the burst signals B+ and B−, as shown in FIG. 9, is delivered from the oscillator 36. The reference signal $S_2$ is fed directly to the demodulator 31 through the switching circuit 37 which is in the switched position opposite to that shown in FIG 7.

Figure 10:
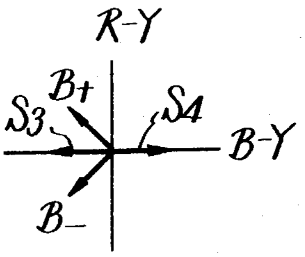
FIGS. 8, 9 and 10 show vector diagrams used for explanation of the operation of the color television receiver shown in FIG. 7.

Burst signals B+ and B−, as shown in FIG. 10, are alternately obtained from the burst gate circuit 39 in any case and hence, as shown in FIG. 10, a reference signal $S_3$ with a phase coincident with the −(B-Y) axis and positioned just between both the burst signals B+ and B− is derived from the oscillator 40. Accordingly, a reference signal $S_4$ with a phase coincident with the B-Y axis, as shown in FIG. 10, is always fed to the demodulator 32 from the (180°) phase shifter 41. As a result, in any case, the demodulators 31 and 32 produce predetermined demodulated color signals.

The positive DC voltage provided at the output terminal of the signal discriminating circuit 49 is applied to the vertical oscillator 43, so that its frequency of oscillation becomes 50 Hz, and is applied to control the vertical output circuit 44 such that the amplitude of the vertical scanning signal and hence the size of the picture and the linearity of the vertical scanning signal are made to be in correspondence with the PAL system color television signal.

Accordingly, the color television signal of the PAL system fed to the input terminal 21 of the receiver is automatically reproduced as a picture on the screen of the receiver as in a receiver for the PAL system only.

The foregoing description is made with respect to the case where the frequency of the color subcarrier in the NTSC system color television signal is made to be 4.43

MHz, which is equal to that of the color subcarrier in the PAL system color television signal, but it will be easily understood that this invention can be adapted to the case where the frequency of the color subcarrier in the NTSC system color television signal is made to be 3.58 MHz and different from that of the color subcarrier in the PAL system color television signal. In such a case, a system for providing a subcarrier signal of 3.58 MHz and a system for providing a subcarrier signal of 4.43 MHz is provided separately and these systems are switched into the circuit under the control of the output from the signal discriminating circuit 49.

In the foregoing description certain circuits, such as the circuits indicated by "boxes" in FIG. 7, were not described in detail since such individual circuits are well known to those skilled in the art.

As described above, with the television receiver according to this invention, the discrimination of a plurality of signals can be positively achieved by the employment of a specific discriminating circuit and two television signals with synchronizing signals having different frequencies can be reproduced normally by automatically switching over parts of the circuit of the television receiver with the output from the discriminating circuit.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A signal discriminating circuit to discriminate between input pulse signals having first and second frequencies, said first frequency being higher than said second frequency, said circuit comprising:

A. a signal input circuit to receive said pulse signals;

B. free-running oscillator means to generate pulse signals having a natural frequency higher than said second frequency, said oscillator being synchronizable to operate in phase-locked condition with respect to said first frequency but not with respect to said second frequency;

C. connecting means joining said input circuit to said oscillator means to supply said received pulse signals to said oscillator means; and D. combining means connected to said signal input terminal and to said oscillator means to combine said received pulse signals and said generated pulse signals to produce an output voltage signal depending on whether said received pulse signals are of the same frequency as said generated pulse signals.

2. The signal discriminating circuit of claim 1 comprising, in addition, a smoothing circuit connected to said combining means to produce a direct voltage when said output voltage signal is present.

3. The signal discriminating circuit of claim 1 in which said received pulse signals are applied to said combining means in one effective polarity and said generated pulse signals are applied to said combining means in the opposite effective polarity, said combining means remaining non-conductive when said received pulse signals and said generated pulse signals are applied thereto simultaneously.

4. The signal discriminating circuit of claim 1 in which said combining circuit comprises a transistor biased to be normally non-conductive and said received pulse signals and said generated pulse signals are both connected to the base of said transistor in mutually opposite polarity, the polarity of one type of said pulse signals being such as to cause said transistor to remain non-conductive, and the polarity of the other type of such pulse signals being such as to make said transistor conductive, the duration of each pulse of said other type being at least as great as the duration of each pulse of said one type.

5. The signal discriminating circuit of claim 4 in which said signal input circuit comprises:

A. a second transistor;

B. load impedance means connected thereto and comprising first and second load impedances in series, said connecting means being connected to said first impedance to apply the pulse signals thereacross to said oscillator means and the base of said first-named transistor being connected to said second load impedance to apply the total pulse signals across both of said load impedances to the base of said first-named transistor.

6. The signal discriminating circuit of claim 5 in which said first-named transistor is of one conductivity type and said second transistor is of the opposite conductivity type.

7. The signal discriminating circuit of claim 5 in which said oscillator means is an emitter-coupled multivibrator comprising:

A. third and fourth transistors;

B. a controllable bias voltage source for said fourth transistor;

C. a capacitor connected in series between the emitters of said third and fourth transistors; and D. an emitter load connected to each of said third and fourth transistors, respectively, the collector of said fourth transistor being connected to the base of said third transistor.

8. The signal discriminating circuit of claim 7 in which said connecting means joining said input circuit to said oscillator means is a diode conductive to the pulse signals across said first impedance to make said third transistor non-conductive.

9. The signal discriminating circuit of claim 8 comprising, in addition, a fifth transistor biased to be normally non-conductive and having its base connected to said oscillator means to receive pulse signals generated thereby, the collector of said fifth transistor being connected to the base of said first-named transistor to supply said generated pulse signals thereto.

10. The signal discriminating circuit of claim 8 comprising, in addition, a rectifier and smoothing circuit connected to said first-named transistor to produce a direct voltage in response to output pulse signals of said first-named transistor when said received pulse signals and said generated pulse signals have different frequencies.

* * * * *